United States Patent
Kasuga

[11] Patent Number: 5,299,465
[45] Date of Patent: Apr. 5, 1994

[54] BALL SCREW INTEGRATED TYPE LINEAR MOVEMENT GUIDING UNIT

[75] Inventor: Shinichi Kasuga, Gunma, Japan

[73] Assignee: NSK Ltd., Tokyo, Japan

[21] Appl. No.: 950,010

[22] Filed: Sep. 24, 1992

[30] Foreign Application Priority Data

Sep. 25, 1991 [JP] Japan .................. 3-77337[U]

[51] Int. Cl.⁵ .................................. F16H 1/18
[52] U.S. Cl. .................. 74/424.8 R; 74/89.15; 74/459; 384/45
[58] Field of Search ............... 74/89.15, 424.8 R, 459; 108/143; 384/43, 44, 45

[56] References Cited

U.S. PATENT DOCUMENTS

| | | | |
|---|---|---|---|
| 3,900,233 | 8/1975 | Thomson | 384/43 |
| 4,074,585 | 2/1978 | Richaud et al. | |
| 4,648,726 | 3/1987 | Katahira | |
| 4,932,279 | 6/1990 | Kasuga | 74/89.15 X |
| 4,953,418 | 9/1990 | Hirose | 74/459 X |
| 4,983,049 | 1/1991 | LeComte | 384/45 |
| 5,074,160 | 12/1991 | Kasuga | 74/459 X |

FOREIGN PATENT DOCUMENTS 61-136805 6/1986 Japan .
2-12554 1/1990 Japan .

*Primary Examiner*—Rodney H. Bonck
*Assistant Examiner*—David W. Laub
*Attorney, Agent, or Firm*—Sughrue, Mion, Zinn, Macpeak & Seas

[57] ABSTRACT

There is disclosed a ball screw integrated type linear movement guiding unit which achieves a stable, smooth operability, and can meet with a high-load and high-rigidity application. Each of ball return passageways which respectively provide ball-circulating passageways of a ball screw system and a linear movement guiding system in the unit is constituted by an axial through hole much larger in diameter than a ball, and a cylindrical member of a synthetic resin which has an inner diameter generally equal to the diameter of the ball and is press-fitted in the through hole. With this construction, the rolling of the balls is effected smoothly. Further, even if the length of a nut is increased to meet with a high-load and high-rigidity use, the ball return passageway can be easily formed.

10 Claims, 3 Drawing Sheets

BALL SCREW INTEGRATED TYPE LINEAR MOVEMENT GUIDING UNIT

BACKGROUND OF THE INVENTION

1. Field of the Invention

This invention relates to a ball screw integrated type linear movement guiding unit preferably suited for use in an operating arm of a robot, an X-Y table and so on, and more particularly to a low-cost ball screw integrated type linear movement guiding unit in which a ball return passageway constituting a ball circulating system is improved to provide a smooth operability even for a high-load and high-rigidity application.

2. Prior Art

One conventional ball screw integrated type linear movement guiding unit is disclosed, for example, in Japanese Utility Model Laid-Open Application No. 2-12554.

This conventional construction comprises a male-threaded shaft having a spirally extending ball screw groove in an outer surface thereof, and a guide rail embracing the male-threaded screw shaft in parallel relation thereto, the guide rail having axial ball-rolling grooves in its side surfaces. A nut is threadedly engaged with on the male-threaded screw shaft via a number of balls rolling through the groove, and ball-rolling grooves opposed respectively to the ball-rolling grooves of the guide rail are formed respectively in the opposite side surfaces of the nut. Through the rolling movement of a number of balls in the opposed ball-rolling grooves, the nut is guided to be linearly axially moved in the forward/rearward direction.

As a ball-circulating passageway of the ball screw system which guides and circulates the balls rolling in the ball screw groove of the ball screw, there is provided a ball-circulating tube of a U-shape incorporated in the upper portion of the nut. On the other hand, as a ball-circulating passageway of a linear movement guiding system which guides and circulate the balls rolling in the opposed ball-rolling grooves of the guide rail and the nut, there are provided through holes which are slightly larger in diameter than the ball and are formed in a thickened portion of the nut, the through hole extending parallel to the ball-rolling grooves. Curved passageways of a semi-doughnut shape each interconnecting the through hole and the ball-rolling grooves are formed in each of end caps mounted respectively on the front and rear sides of the nut.

However, in the above conventional ball screw integrated type linear movement guiding unit, in order to form the ball-circulating passageway of the linear movement guiding system for guiding and circulating the balls rolling in the opposed ball-rolling grooves of the guide rail and the nut, the axial through hole is drilled in the thickened portion of the nut, and the balls are passed directly through this hole serving as a ball return passageway. Therefore, because of the roughness of the drilled hole surface, scales formed on the drilled hole surface at a subsequent heat treatment of the nut, a step on a joined portion of the hole, and so on, a smooth passage of the balls is prevented, which results in a problem that the circulation of the balls becomes unstable.

Further, even if it is intended to increase the ball load passageway of the linear movement guiding system for a high-load and high-rigidity application, the length of the nut in its axial direction is increased, and therefore the length of the ball return passageway must also be increased. As a result, the hole having a high length-diameter ratio must be formed, and therefore there has been encountered a problem that the length is limited in this respect.

In order to overcome the difficulty with the working of the ball return passageway of the ball system integrated type linear movement guiding unit, the Applicant of the present application has earlier made a proposal in which the diameter of the through hole is made considerably larger than the diameter of the ball so as to improve the precision and efficiency of the working, and a pipe is press-fitted into this through hole to form the ball return passageway (U.S. Pat. No. 4,648,726).

SUMMARY OF THE INVENTION

With the above problems in view, it is an object of this invention to provide a ball screw integrated type linear movement guiding unit which is provided by applying the invention of the above U.S. Pat. No. 4,648,726 to a ball screw integrated type linear movement guiding unit, and has a stable, smooth operability, and can easily meet with a high-load and high-rigidity application.

According to the present invention, there is provided a ball screw integrated type linear movement guiding unit, comprising a guide rail having ball-rolling grooves axially formed respectively in side surfaces thereof, and a screw shaft which is disposed parallel to the guide rail and has a ball screw groove in its outer surface; wherein a nut, having a ball screw groove opposed to the ball screw groove of the screw shaft, is threadedly engaged with the screw shaft through a number of balls rolling in the two opposed ball screw grooves; the nut has ball-rolling grooves formed respectively in opposite side surfaces thereof and opposed respectively to the ball-rolling grooves of the guide rail; and the nut is movable in an axial direction through a number of balls received in each pair of the opposed ball-rolling grooves;

characterized in that either through holes serving as return passages for the balls in the ball-rolling grooves, or a through hole serving as a return passage for the balls in the ball screw grooves are provided in a thickened portion of the nut in parallel relation to the screw shaft; and a cylindrical ball guide member is inserted in the through hole.

The through hole of the ball return passageway is much larger in diameter than the ball, and therefore the length-diameter ratio is reduced to improve the drilling precision and the working efficiency. In other words, even if the length of the nut is increased in order to meet a high-load and high-rigidity use, the through holes can be formed.

Further, the ball guide member is inserted into the through hole so that the circulating balls passes through the bore of the ball guide member. Therefore, a smooth movement of the balls can be obtained irrespective of the condition of the wall of the through hole.

DESCRIPTION OF THE PREFERRED EMBODIMENTS

A preferred embodiment of the present invention will now be described with reference to the drawings.

Figure 1:
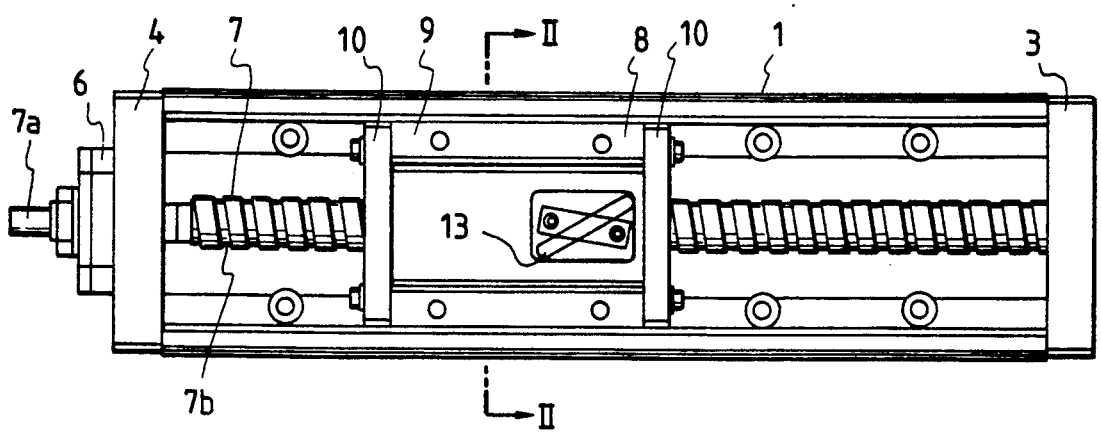
FIG. 1 is a plan view of one preferred embodiment of the present invention.
Figure 2:
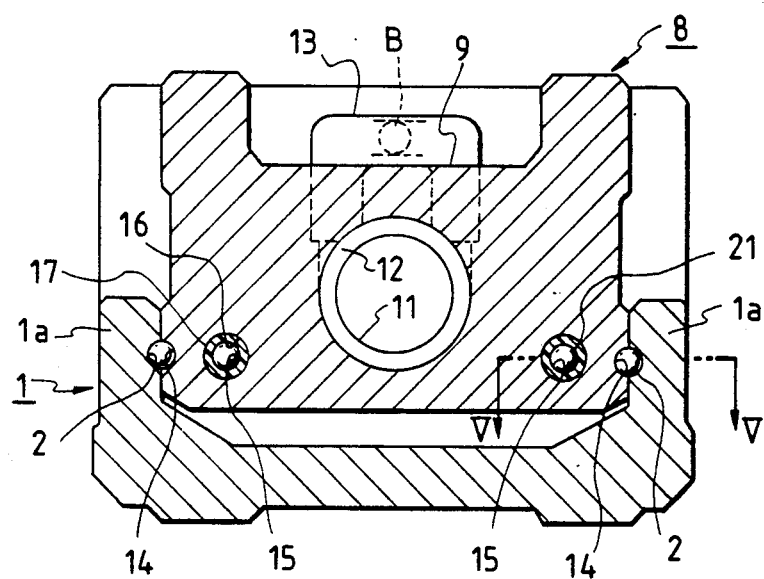
FIG. 2 is a cross-sectional view taken along the line II—II of FIG. 1.
Figure 3:
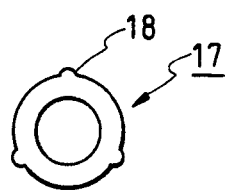
FIG. 3 is a front-elevational view of a ball guide member (cylindrical member)
Figure 4:
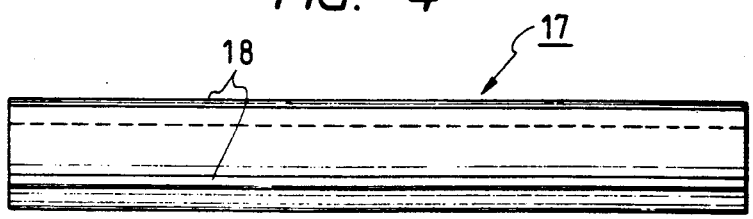
FIG. 4 a side-elevational view of the cylindrical member.
Figure 5:
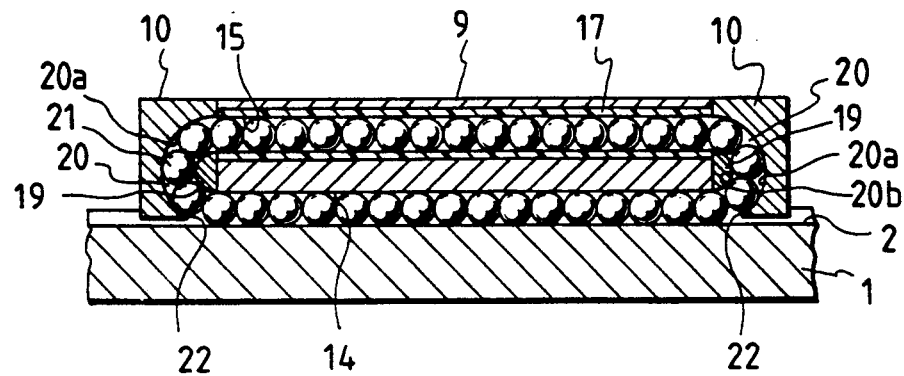
FIG. 5 is a view taken along the line V—V of FIG. 2.
Figure 6:
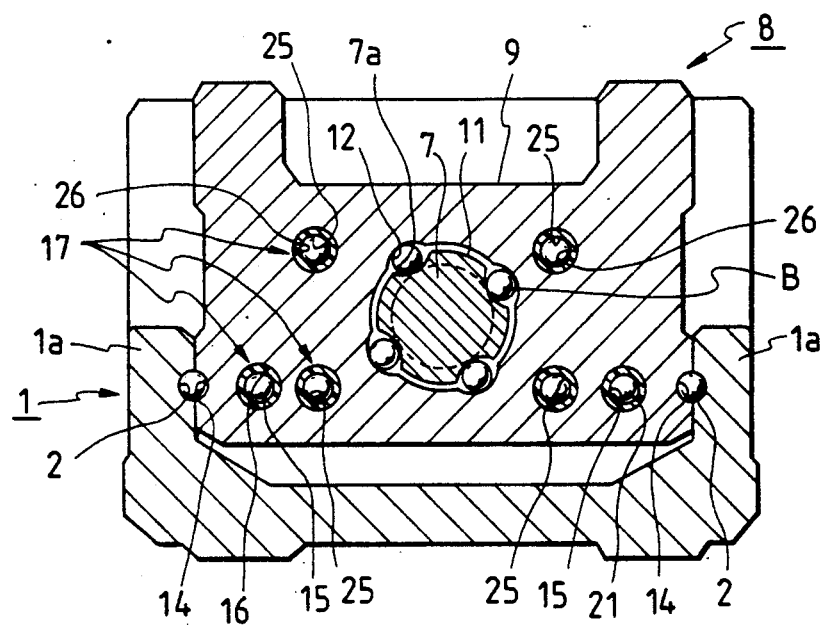
FIG. 6 is a view similar to FIG. 1, but showing another embodiment of invention.

FIG. 1 is a plan view of one preferred embodiment of the present invention, FIG. 2 is a cross-sectional view taken along the line II—II of FIG. 1, FIG. 3 is a front-elevational view of a cylindrical member, FIG. 4 is a side-elevational view of the cylindrical member, and FIG. 5 is a cross-sectional view taken along the line V—V of FIG. 2.

A guide rail 1 has a generally U-shaped transverse cross-section, and has a pair of opposed axially extending ball rolling grooves 2 which extend axially and are formed respectively in inner surfaces of opposite side edge portions 1a and 1a extending upright from the bottom surface of the guide rail 1. Bearing plates 3 and 4 are secured by screws to the opposite axial ends of the guide rail 1, respectively. A ball bearing (not shown) is mounted on the bearing plate 3, and ball bearings (not shown) are mounted in a double manner on the bearing plate 4 through a bearing housing 6. A male-threaded screw shaft 7 of a ball screw is supported by these bearings, and is disposed centrally of the width of the guide rail 1 in parallel relation to the ball-rolling grooves 2. One end portion 7a of the male-threaded screw shaft 7 is projected outwardly from the bearing housing 6, and is connectable to an output shaft of a drive motor (not shown).

A nut 8 of a tube re-circulation-type ball screw is threadedly engaged with the screw shaft 7 through steel balls B. The nut 8 includes a square nut body 9, and end caps 10 secured by bolts to the front and rear ends of the body 9, respectively. A female-threaded ball screw groove 12 corresponding to a ball screw groove 7b of the screw shaft 7 is formed in an inner peripheral surface of a screw hole 11 formed in the central portion of the nut body 9. The balls B are received in a ball-rolling passageway formed by the two screw grooves 7b and 12. A U-shaped ball-circulating tube 13 is mounted on the upper portion of the nut body 9, the balls B are introduced from the ball-rolling passageway into the ball-circulating tube 13, and move along this tube to pass obliquely across the land portion of the screw shaft 7, and are again returned to the ball-rolling passageway. This is a well-known tube circulation construction.

The width of the nut body 9 is slightly smaller than the distance between the opposite side edge portions 1a and 1a of the guide rail 1. Ball-rolling grooves 14 are formed respectively in the right and left side surfaces of the lower portion of the nut body 9, and are disposed in opposed relation to the ball-rolling grooves 2 of the guide rail 1, respectively. Further, ball return passageways 15 are formed in a thickened portion of the nut, and are disposed parallel to the ball-rolling grooves 14.

For forming the ball return passageway 15, a through hole 16 much larger in diameter than the ball B is first formed, and then a cylindrical member (ball guide member) 17 of a synthetic resin having a bore slightly larger in diameter than the ball B is press-fitted into the through hole 16. In this embodiment, as shown in FIGS. 3 and 4, small projections 18 for assembling purposes are formed on the outer peripheral surface of the ball guide member 17, and are circumferentially spaced from one another at equal intervals. Due to the elastic deformation of the small projections 18, the ball guide member 17 can be easily press-fitted in the through hole 16. Preferably, the ball guide member 17 should be made of a synthetic resin having a high elasticity and a low friction coefficient. However, the synthetic resin itself may be not low in friction coefficient, in which case a fluororesin coating is applied to the inner peripheral surface of the ball guide member 17.

As shown in FIG. 5, curved passageways 20 of a semi-doughnut shape each communicating the ball-rolling groove 14 with the ball return passageway 15 are formed in the connection end surfaces of the end caps 10 connected to the nut body 9. Referring to the semi-doughnut-shaped curved passageway 20, semi-circular recesses 20a of a larger diameter are formed in the connection end surface of the end cap 10, and a semi-cylindrical recess 20b of a smaller diameter is formed at a central position of an opening of the semi-circular recess 20a in perpendicular relation to this opening, and a semi-cylindrical return guide 19 is fitted in the semi-cylindrical recess 20b.

Thus, provided at the lower portion of the nut 8 are endless ball-circulating passageways of a linear guide system each of which is constituted by the ball-rolling groove 2 of the guide rail 1, the ball rolling groove 14 opposed thereto, the ball return passageway 15 having the ball guide member 17, and the curved passageways 20 and 20 at the opposite ends, as shown in FIG. 5. A number of balls 21 are rotatably received in this endless ball-circulating passageway. One end of the curved passageway 20 is formed as a scooping projection 22 for picking up the balls 21 from the ball-rolling groove 2 of the guide rail to smoothly introduce them into the curved passageway 20.

The operation will now be described. when the screw shaft 7 is rotated in a normal/clockwise (or reverse/-counter-clockwise) direction by the drive motor (not shown), this rotation is transmitted to the nut 8 through the balls B of the ball screw system interposed between the ball screw groove 7b of the screw shaft 7 and the ball thread groove 12 of the nut 8, so that the nut 8 moves axially in a forward (or backward) direction. The rotation of the nut 8 is prevented by the balls 21 of the linear movement guiding system interposed between the ball-rolling groove 14 of the nut and the ball rolling groove 2 of the guide rail. The balls B and 21 of the two systems rotatably move in response to the movement of the nut 8 to circulate in their respective endless circulating passageways.

In this case, at the ball return passageway 15 of the endless ball circulating passageway of the linear movement guiding system, the balls 21 pass through the bore of the ball guide member 17 of a synthetic resin which is smooth and has a low friction coefficient, and is free from a step and scales. Therefore, the rolling of the balls are quite smooth and stable. Further, since the diameter of the through hole 16 of the ball return passageway 15 is much larger than a conventional one, the length-diameter ratio is small, and the working is quite easy, and the construction with the nut body 9 of an increased length for a high-load and high-rigidity application can be provided at low costs.

FIGS. 6 to 9 show a second embodiment.

This embodiment differs from the above first embodiment in that a ball-circulating passageway of a ball screw system is not of a tube circulation type, but is constituted by curved passageways 34, formed in end caps (circulation members) 10 attached respectively to opposite ends of a nut body 9, and ball return passageways 25 formed axially in a thickened portion of the nut body 9.

More specifically, in addition to ball return passageways 15 of a linear movement guiding system, four parallel ball return passageways 25 of the ball screw system are formed in the thickened portion of the nut body 9 in surrounding relation to a screw hole 11, and are circumferentially spaced from one another at generally equal intervals. The ball screw of this second embodiment is a multi-threaded (four-threaded) screw, and the ball return passageway 25 is provided for each thread.

Figure 7:
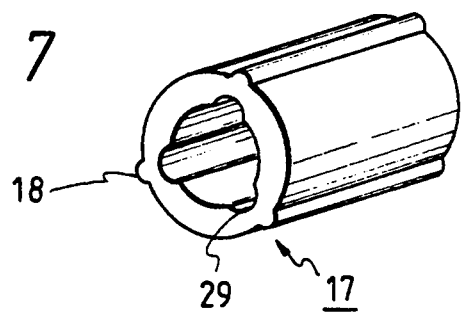
FIG. 7 is a front-elevational view of a cylindrical member in said another embodiment.

For providing the ball return passageway 25, a through hole 26 much larger in diameter than a ball B is first formed, and then a cylindrical member (ball guide member) 17 of a synthetic resin having a bore slightly larger in diameter than the ball B is press-fitted into the through hole 26. The ball guide member 17 may be the same as that (FIGS. 3 and 4) used for the ball return passageway 15 of the linear movement guiding system. Alternatively, as shown in FIG. 7, the ball guide member 17 may have a plurality of narrow grooves 29 which are formed axially in the inner peripheral surface, and are circumferentially spaced from one another at equal intervals. These grooves 29 serve as lubricant reservoirs for oil, grease and the like. Similar lubricant reservoir grooves 29 may be formed in the ball guide member 17 for the ball return passage 15 of the linear movement guiding system.

Figure 8:
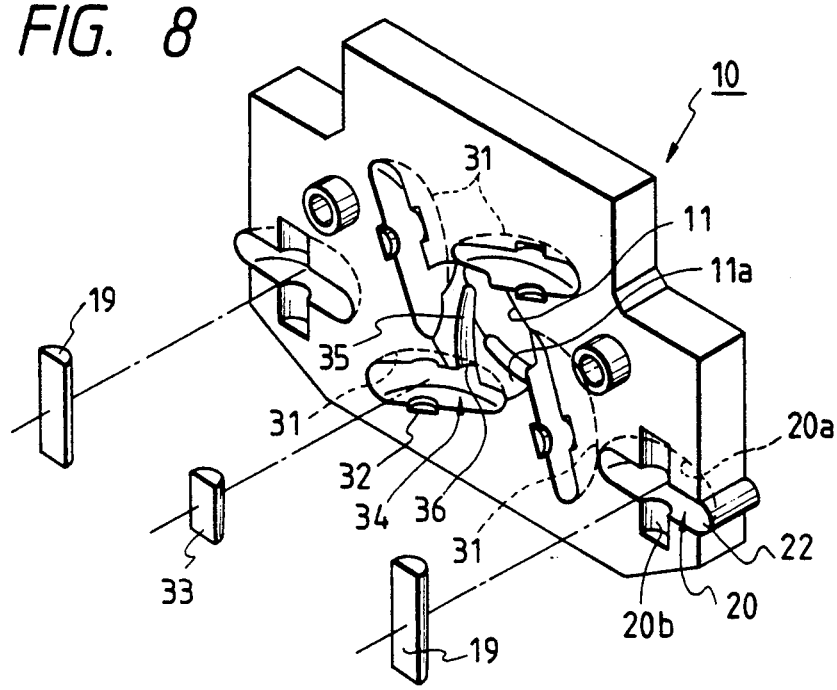
FIG. 8 is an exploded perspective view of an end cap of said another embodiment.
Figure 9:
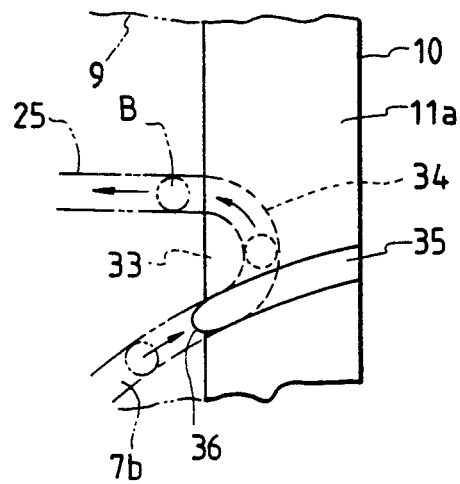
FIG. 9 a view showing the condition of interconnection between a curved passageway (formed in the end cap of FIG. 8) of the ball screw system, a ball-rolling groove and a ball return passageway of a nut body.

Four semi-circular recesses 31 of a large diameter mated respectively with the ball return passageways 25 of the ball screw system are formed in the connection end surface of the end cap 10 connected to the nut body 9, and are inclined in a tangential direction in surrounding relation to the screw hole 11 of a male-threaded screw shaft 7, the four semi-circular recesses 31 being circumferentially spaced from one another at equal intervals (see FIG. 8). A semi-cylindrical recess 32 of a smaller diameter is formed at a central position of an opening of the semi-circular recess 31 in perpendicular relation to this opening, and a semi-cylindrical return guide 33 (only one is shown) is fitted in the semi-cylindrical recess 32, thereby forming a curved passageway 34 of a generally semi-doughnut shape (FIG. 9). The curved passageway 34 of the ball screw system communicates each of the screw grooves 7b of the four-thread ball thread of the screw shaft 7 with the corresponding ball return passageway 25. Spirally extending projections 35, mated respectively with the screw grooves 7b of the four-threaded ball screw of the screw shaft 7, are formed on the inner peripheral surface 11a of the screw shaft 7, are formed on the inner peripheral surface 11a of the screw hole 11 of the screw shaft 7, the spirally extending projections 35 being arranged to intersect the curved passageways 34, respectively, so as to engage the respective ball screw grooves 7b. With this construction, the endless ball circulating passageway, constituted by the ball screw groove 7b of the screw shaft, a female-threaded ball screw groove 12 of the nut opposed thereto, the ball return passageway 25 and the curved passageway 34, is formed similarly to the endless ball circulating passageway of the linear movement guiding system, and a number of balls B (FIG. 9) are rotatably received in this endless ball circulating passageway. Each spirally extending projection 35 serves as a dust prevention seal for the ball screw groove 7b of the threaded shaft, and the end of this spirally extending projection facing the ball thread groove 7b serves as a scooping projection 36 which picks up the ball B from the ball screw groove 7b to smoothly introduce it into the curved passageway 34.

In this case, the direction of movement of the balls B of the ball screw system is turned by the curved passageways 34. Namely, as the nut 8 moves, each ball B rotatably moves in the ball screw grooves 7b and 12 of the screw shaft and the nut to reach one end cap 10 whereupon the ball B strikes against a curved surface of the scooping projection 36 at the end of the spirally extending projection 35, as shown in FIG. 9. Therefore, the ball is guided by this curved surface and is introduced into the curved passageway 34 in the end cap 10, and is turned along a U-shaped path, and enters the ball return passageway 25 in the nut body 9. The ball rotatably moves in this ball return passageway 25, and reaches the other end cap whereupon the ball is introduced into the curved passageway 34, and is turned in a reverse direction along a U-shaped path, and is guided by a curved surface of the scooping projection 36 at the end of the spirally extending projection 35, and is returned to the ball thread grooves 7b and 12. This circulation is repeated.

Thus, the ball-circulating tube of the ball screw system which is essential for the conventional direct-acting guide unit with an integral ball thread becomes unnecessary, and the number of the component parts as well as the assembling steps can be reduced. Further, in the above circulation, the ball return passageway 25 is provided by the bore of the ball guide member 17, and besides a lubricant is supplied from the grooves 29, and therefore a smoother circulation of the balls can be achieved.

In this embodiment, the four ball circulating passageways of the ball screw system are provided around the screw shaft 7, and the screw shaft 7 is a four-threaded screw, and by doing so, the lead is increased four times larger than that obtained by a single-threaded screw of the same diameter, without decreasing the load capacity. With this construction, the nut 8 can be fed at a speed four times higher at the same revolution number. Further, the revolution number is reduced to ¼ at the same feed sped, so that a high-precision positioning can be made. Further, in this embodiment, the spirally extending projections 35 are engaged respectively in the ball thread grooves 7b of the screw shaft 7, and therefore not only the end projection picks up the balls, but also this construction serves as a dust prevention device for the ball screw system.

While the present invention has been described above merely with respect to a single preferred embodiment thereof, it should of course be understood that the present invention should not be limited only to this embodiment but various change or modification may be made without departure from the scope of the present invention as defined by the appended claims. For example, the present invention may equally be applied to a single row spherical roller bearing without any modification from the construction as mentioned above.

What is claimed is:

1. A linear movement guiding unit comprising:
   a guide rail having ball-rolling grooves axially formed respectively in side surfaces thereof;
   a screw shaft which is disposed parallel to said guide rail and has a ball screw groove in its outer surface;
   a nut having a ball screw groove opposed to said ball screw groove of said screw shaft through a number of balls rolling in said two opposed ball screw grooves, said nut having ball-rolling grooves formed respectively in opposed side surfaces thereof and opposed respectively to said ball-rolling grooves of said guide rail, and said nut being movable in an axial direction through a number of balls received in each pair of said opposed ball-rolling grooves, said nut being provided with at least two first through holes serving as return passages for said balls in said opposed ball rolling grooves, respectively, said first through holes being provided in a thickened portion of said nut in parallel relation to said screw shaft;
   first communicating means for communicating said first through holes with said opposed ball rolling grooves so as to circulate said balls among said first through holes, said ball rolling grooves and said first communicating means, respectively;
   first ball guiding means inserted in said first through holes for guiding the balls therein smoothly;
   said nut having a second through hole serving as a return passage for said balls in said ball screw groove, said second through hole being provided in a thickened portion of said nut in parallel relation to said screw shaft;
   a second communicating means for communicating said second through hole and said ball screw grooves so as to circulate said balls among said second through hole, said ball screw grooves and said communicating means; and
   a second ball guiding means inserted in said second through hole for guiding said balls therein smoothly.

2. A linear movement guiding unit according to claim 1, wherein said guide rail is U-shaped in a cross-section and said ball rolling groove is formed in an inner side wall of the U-shaped guide rail.

3. A linear movement guiding unit according to claim 1, wherein at least one of said first ball guiding means and said second ball guiding means is made of a synthetic resin having a bore slightly larger in diameter than said balls.

4. A linear movement guiding unit according to claim 1, wherein at least one of said first ball guiding means and said second ball guiding means has projections which are formed on the outer peripheral surface thereof and are circumferentially spaced from one another.

5. A linear movement guiding unit according to claim 4, in which at least one of said first ball guiding means and said second ball guiding means has grooves which are formed axially in the inner peripheral surface thereof and are circumferentially spaced from one another at equal intervals.

6. A linear movement guiding unit according to claim 1, wherein said first through hole is the same as said second through hole in a diameter.

7. A linear movement guiding unit comprising:
   a nut body including axial ball-rolling grooves parallel to each other, and a screw hole disposed parallel to said ball-rolling grooves, a screw shaft being passed through said screw hole, first through holes mated respectively with said axial ball-rolling grooves, as well as one or more second through holes corresponding in number to the thread or threads of said threaded shaft, being formed in a thickened portion of said nut body;
   a first ball guide member fitted in each said first through hole, said first ball guide member having a bore slightly larger in diameter than a number of first balls which are interposed between said axial ball-rolling groove of said nut body and a ball-rolling groove of a guide rail opposed to said axial ball-rolling groove;
   a second ball guide member fitted in each said second through hole, said second ball guide member having a bore slightly larger in diameter than a number of second balls which are interposed between a ball screw groove of said nut body and a ball screw groove of said threaded shaft corresponding to said ball screw groove of said nut body; and
   end caps fixedly mounted on said nut body, each of said end cap having a first curved passageway communicating each said axial ball-rolling groove of said nut body with the bore of said first ball guide member, and a second curved passageway communicating said ball screw groove of said nut body with the bore of said second ball guide member.

8. A linear movement guiding unit according to claim 7, wherein said first ball guide member has projections which are formed on the outer peripheral surface thereof and are circumferentially spaced from one another, and said second ball guide member has projections which are formed on the outer peripheral surface thereof and are circumferentially spaced from one another.

9. A linear movement guiding unit according to claim 8, in which said first ball guide member has grooves which are formed axially in the inner peripheral surface thereof and are circumferentially spaced from one another, and said second ball guide member has grooves which are formed axially in the inner peripheral surface thereof and are circumferentially spaced from one another.

10. A linear movement guiding unit according to claim 7, wherein said first through hole is the same as said second through hole in a diameter.

* * * * *